(12) United States Patent
Pons et al.

(10) Patent No.: US 8,418,018 B2
(45) Date of Patent: Apr. 9, 2013

(54) HIERARCHICAL TRELLIS CODED MODULATION

(75) Inventors: Julien Pons, Eatontown, NJ (US);
Patrick Duvaut, Tinton Falls, NJ (US);
Oliver Moreno, Eatontown, NJ (US);
Laurent Pierrugues, Tinton Falls, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 528 days.

(21) Appl. No.: 12/565,939

(22) Filed: Sep. 24, 2009

(65) Prior Publication Data

US 2010/0017678 A1  Jan. 21, 2010

Related U.S. Application Data

(62) Division of application No. 10/970,718, filed on Oct. 22, 2004, now Pat. No. 7,613, 985.

(60) Provisional application No. 60/513,535, filed on Oct. 24, 2003.

(51) Int. Cl.
*H03M 13/00* (2006.01)

(52) U.S. Cl.
USPC ........... 714/752; 714/758; 714/784; 375/261; 375/298

(58) Field of Classification Search .................. 714/758, 714/784; 375/261, 298
See application file for complete search history.

(56) References Cited

U.S. PATENT DOCUMENTS

| | | | |
|---|---|---|---|
| 4,601,044 A | 7/1986 | Kromer, III et al. |
| 4,713,817 A | 12/1987 | Wei |
| 4,713,829 A | 12/1987 | Eyuboglu |
| 4,873,701 A | 10/1989 | Tretter |
| 5,105,442 A | 4/1992 | Wei |
| 5,159,610 A | 10/1992 | Eyuboglu |
| 5,214,656 A | 5/1993 | Chung et al. |
| 5,214,672 A | 5/1993 | Eyuboglu |
| 5,243,419 A | 9/1993 | Faryar et al. |
| 5,243,629 A | 9/1993 | Wei |
| 5,247,579 A | 9/1993 | Hardwick et al. |
| 5,258,987 A | 11/1993 | Wei |

(Continued)

FOREIGN PATENT DOCUMENTS

EP  1324558 A1  7/2003

OTHER PUBLICATIONS

Wei "Rotaionally Invariant Convolutional Channel Coding with Expanded Signal Space—Part 1: 180", Sep. 1984, vol. SAC-2 No. 5, IEEE, pp. 659-671.*

(Continued)

*Primary Examiner* — Scott Baderman
*Assistant Examiner* — Jeison C Arcos
(74) *Attorney, Agent, or Firm* — Pillsbury Winthrop Shaw Pittman LLP

(57) ABSTRACT

A system and method for encoding information is disclosed. In one embodiment, information is encoded using a high protection code for the least significant bit and a low protection code for the next three most significant bits. The remaining bits are uncoded. The high protection code may be a turbo code and the low protection code may be a trellis coded modulation code. In this embodiment, the collection of bits is then mapped according to a diagonally shifted QAM constellation technique.

34 Claims, 6 Drawing Sheets

U.S. PATENT DOCUMENTS

| | | | |
|---|---|---|---|
| 5,287,374 | A | 2/1994 | Parr |
| 5,289,501 | A | 2/1994 | Seshadri et al. |
| 5,305,352 | A | 4/1994 | Calderbank et al. |
| 5,377,194 | A | 12/1994 | Calderbank |
| 5,428,646 | A | 6/1995 | Eyuboglu |
| 5,453,997 | A | 9/1995 | Roney, IV |
| 5,467,132 | A | 11/1995 | Fazel et al. |
| 5,491,772 | A | 2/1996 | Hardwick et al. |
| 5,535,228 | A | 7/1996 | Dong et al. |
| 5,544,328 | A | 8/1996 | Seshadri |
| 5,606,569 | A * | 2/1997 | MacDonald et al. ......... 714/758 |
| 5,923,650 | A | 7/1999 | Chen et al. |
| 6,031,874 | A | 2/2000 | Chennakeshu et al. |
| 6,160,854 | A | 12/2000 | Heegard et al. |
| 6,223,324 | B1 | 4/2001 | Sinha et al. |
| 6,353,637 | B1 | 3/2002 | Mansour et al. |
| 6,357,029 | B1 | 3/2002 | Sinha et al. |
| 6,378,101 | B1 | 4/2002 | Sinha et al. |
| 6,392,572 | B1 | 5/2002 | Shiu et al. |
| 6,396,804 | B2 | 5/2002 | Odenwalder |
| 6,397,367 | B1 | 5/2002 | Park et al. |
| 6,405,338 | B1 | 6/2002 | Sinha et al. |
| 6,430,401 | B1 | 8/2002 | Lou et al. |
| 6,484,283 | B2 | 11/2002 | Stephen et al. |
| 6,549,584 | B1 * | 4/2003 | Gatherer et al. ............. 375/261 |
| 6,618,367 | B1 | 9/2003 | Riazi et al. |
| 6,624,767 | B1 | 9/2003 | Shiu et al. |
| 6,665,831 | B1 | 12/2003 | Yoshida et al. |
| 6,671,327 | B1 | 12/2003 | Jin |
| 6,697,988 | B2 | 2/2004 | Kim et al. |
| 6,757,859 | B1 | 6/2004 | Jin |
| 6,757,860 | B2 | 6/2004 | Choi et al. |
| 6,769,091 | B2 | 7/2004 | Classon et al. |
| 6,775,254 | B1 | 8/2004 | Willenegger et al. |
| 6,859,906 | B2 | 2/2005 | Hammons et al. |
| 6,931,372 | B1 | 8/2005 | Sinha et al. |
| 7,162,541 | B2 | 1/2007 | Koo et al. |
| 7,178,089 | B1 | 2/2007 | Frenger et al. |
| 7,190,732 | B2 | 3/2007 | Chung et al. |
| 7,190,737 | B2 | 3/2007 | Okamoto |
| 7,206,326 | B2 | 4/2007 | Samaras et al. |
| 7,239,667 | B2 | 7/2007 | Shen et al. |
| 7,251,285 | B2 | 7/2007 | Lee et al. |
| 2001/0028684 | A1 * | 10/2001 | Chung et al. ................ 375/261 |
| 2002/0051501 | A1 * | 5/2002 | Demjanenko et al. ........ 375/298 |

OTHER PUBLICATIONS

Bengtsson "Trellis Coding in a Descrete Multitone Modulation System", Mar. 1997, Lulea University of Technology, pp. 1-5.*

Pietrobon, "Trellis-Coded Multidimensional Phase modulation", Jan. 1990, IEEE, vol. 36 No. 1, pp. 63-89.*

Xianodong, "Bit-Interleaved coded modulation with iterative decoding and 8PSK signaling", Aug. 2002, IEEE, vol. 50 No. 8, pp. 1250-1257.*

Robertson, "Bandwith-Efficient Turbo Trellis-Coded Modulation Using Punctured Component Codes", Feb. 1998, IEEE, vol. 16 No. 2, pp. 206-218.*

Ungerboeck, "Channel Coding with Multilevel/Phase Signals," IEEE Transactions on Information Theory, vol. IT-28, No. 1, Jan. 1982, pp. 55-67.

Zhang, et al., "Turbo Coding in ADSL DMT Systems," IEEE, 2001, pp. 151-155.

Li, et al., "A New Turbo Coded QAM Scheme with Very Low Decoding Complexity for ADSL System," IEEE, 2001, pp. 349-353.

Imai, et al., "A new Multilevel Coding Method Using Error-Correcting Codes,", IEEE Transactions on Information Theory, vol. IT-23, No. 3, 1977, pp. 371-377.

Berrou, et al., "Near Shannong Limit Error-Correcting Coding and Decoding: Turbo-Codes (1)," IEEE, 1993, pp. 1064-1070.

Benedetto, et al., "Design of Parallel Concatenated Convolutional Codes," IEEE Transactions on Communications, vol. 44, No. 5, May 1996, pp. 591-600.

Rajpal, et al., "Multidimensional Trellis Coded Phase Modulation Using a Multilevel Concatenation Approach Part I: Code Design," IEEE Transactions on Communications, vol. 45, No. 1, Jan. 1997, pp. 64-72.

Wei, "Trellis-Coded Modulation with Multidimensional Constellations," IEEE Transactions on Information Theory, vol. IT-33, No. 4, Jul. 1987, pp. 483-501.

Ungerboeck, "Trellis-Coded Modulation with Redundant Signal Sets Part II: State of the Art," IEEE Communications Magazine, vol. 25, No. 2, Feb. 1987, pp. 12-21.

International Telecommunications Union, Recommendation G.992.1, Approved in Jul. 1999, "Asymmetrical Digital Subscriber Line (ADSL) Transceivers", pp. 1-240.

Zhang, et al., "Turbo Coding for Transmission over ADSL," Communication Technology Proceedings, WCC ICCT 2000, vol. 1, pp. 124-131, Aug. 2000.

$3^{RD}$ Generation Partnership Project (3GPP); Technical Specification Group Group Radio Access Network, Multiplexing and channel coding (FDD), 3G TS 25.212 version 3.1.0, 1999, 52 pgs.

* cited by examiner

HIERARCHICAL TRELLIS CODED MODULATION

CROSS-REFERENCE TO RELATED APPLICATIONS

This application is a divisional of Ser. No. 10/970,718, filed Oct. 22, 2004, now U.S. Pat. No. 7,613,985, which claims priority to U.S. Provisional Patent Application Ser. No. 60/513,535 filed Oct. 24, 2003, entitled "Hierarchical Trellis Coded Modulation," to Duvaut et al., the disclosure of which is expressly incorporated by reference herein in its entirety.

FIELD OF THE INVENTION

The present invention generally relates to coding information over a channel. More particularly, the invention relates to using high protection coding and low protection coding together to form a low-complexity, high-net-coding-gain coding scheme.

BACKGROUND OF THE INVENTION

Trellis coded modulation (TCM), introduced in 1982, is a combined channel coding and modulation technique. TCM improved coding gain, relative to existing techniques, without sacrificing either rate or the bandwidth. In the late 1980's, the original 2-dimensional (2D) TCM code was generalized to multidimensional modulations, offering a better trade-off between coding gain and complexity. However, these techniques cannot reach coding gains of 5-6 dB without excessive decoding complexity. In B. Li, A. Deczky, and A. Ginesi, "A new turbo coded QAM scheme with very low decoding complexity," *Global Telecommunications Conference*, vol. 1, pp. 349-353, November 2001, the authors proposed a multilevel TCM code with reduced complexity. However, the proposed scheme concatenates several constituent codes with similar error-correcting capabilities and thus does not significantly improve coding gain.

Asymmetric Digital Subscriber Lines (ADSL) is a broadband technology for transmitting digital information at high speeds on the existing Public Switch Telephone Network (PSTN). The system is based on the Discrete Multitone (DMT) technique that divides the bandwidth in up to 256 orthogonal frequency subcarriers (tones) able to transmit independently from 2 to 15 bits/s/Hz, with 2-dimensional (2D) Quadrature Amplitude Modulation (QAM) constellations, optimized according to the SNR in each frequency band for a Bit Error Rate (BER) of $10^{-7}$. To further improve the "bit loading" of each tone, the G.992.1 International Telecommunication Union (ITU) standard recommends a coding chain formed by the serial concatenation of a Reed-Solomon (RS) code and a Trellis Coded Modulation (TCM) separated by an interleaver. Two modes are distinguished: 1) a fast mode without the interleaver and 2) a long latency mode, with interleaving, that allows a higher coding gain while increasing the transmission delay. The standard suggests using Wei's 16-state 4D TCM code as the inner code. See L. F. Wei, "Trellis-coded modulation with multidimensional constellations," *IEEE Trans. Inform. Theory*, vol. 33, no. 4, pp. 483-501, July 1987.

Several unsuccessful attempts have been made to standardize an enhanced inner code for ADSL based on Turbo Trellis Coded Modulations (TTCM). Some schemes encoding two bits per tone achieve a coding gain of up to 6.8 dB (with RS code) for a BER of $10^{-7}$ (e.g., the B. Li, A. Deczky, and A. Ginesi scheme cited above or that of L. Zhang and A. Yongacoglu, "Turbo coding for transmission over ADSL," *Communication Technology Proceedings, WCC ICCT* 2000, vol. 1, pp. 124-131, August 2000). However, the inherent high complexity of such schemes prevented the ASDL standardization committee from further considering these options as realistic better alternatives to the TCM scheme.

SUMMARY OF THE INVENTION

The present invention mitigates or solves the above-identified limitations in known solutions, as well as other unspecified deficiencies in known solutions. A number of advantages associated with the present invention are readily evident to those skilled in the art, including economy of design and resources, transparent operation, cost savings, etc.

According to an embodiment of the invention, a method of encoding a quantity of electronic information is disclosed. The method includes encoding a first portion of the quantity of information using a high protection code encoder to produce a first coded portion of information, encoding a second portion of the quantity of information using a low protection code encoder to produce a second coded portion of information and mapping the first coded portion of information, the second coded portion of information, and a third portion of the quantity of information to at least one symbol.

Various optional and preferable features of the above embodiment include the following. The high protection code may include a turbo code or a low-density parity-check code. The high protection code may not limit the asymptotic performance of the method. The relation $d_{free,hpc} > D_N^{n+p} d_{free,lpc}$ may be satisfied, where $d_{free,hpc}$ is the free Euclidean distance of the high protection code, $d_{free,lpc}$ is the free Euclidean distance of the low protection code, and $D_N^{n+p}$ is a distance coefficient. The distance coefficient may satisfy $$D_N^{n+p} = 2^{\frac{n+p}{N}}.$$

The quantity of information may be present on a signal that includes 1D lattice-type signal sets or 2D lattice-type signal sets. The distance coefficient may satisfy $D_4^1 = D_4^2 = \sqrt{2}$, and $D_4^3 = D_4^4 = 2$. The quantity of information may be present on a signal that includes a 4D lattice-type signal set. The low protection code may include a trellis coded modulation code. The low protection code may include a Wei code. The Wei code may be consistent with ITU G.992.1 standard. The quantity of information may include ADSL information. The mapping may include using at least one diagonally shifted quadrature amplitude modulation constellation. The first quantity of information may include a least significant bit. The second quantity of information may include three bits, where the three bits excluding a least significant bit.

According to an embodiment of the invention, a system for encoding a quantity of electronic information is disclosed. The system includes a high protection code encoder configured to encode a first portion of the quantity of information to produce a first coded portion of information, a low protection code encoder configured to encode a second portion of the quantity of information to produce a second coded portion of information, and a modulator configured to map the first coded portion of information, the second coded portion of information, and a third portion of the quantity of information to at least one symbol.

Various optional and preferable features of the above embodiment include the following. The high protection code encoder may include a turbo code encoder or a low-density parity-check code encoder. The high protection code encoder may not limit the asymptotic performance of the system. The relation $d_{free,hpc} > D_N^{n+p} d_{free,lpc}$ may be satisfied, where $d_{free,hpc}$ is the free Euclidean distance of a high protection code implemented by the high protection code encoder, $d_{free,lpc}$ is the free Euclidean distance of a low protection code implemented by the low protection code encoder, and $D_N^{n+p}$ is a distance coefficient. The distance coefficient may satisfy $$D_N^{n+p} = 2^{\frac{n+p}{N}}.$$

The system may be configured to produce a signal that includes 1D lattice-type signal sets or 2D lattice-type signal sets. The distance coefficient may satisfy $D_4^1 = D_4^2 = \sqrt{2}$ and $D_4^3 = D_4^4 = 2$. The high protection encoder may be configured to produce a signal that includes a 4D lattice-type signal set. The low protection code encoder may be configured to encode according to trellis coded modulation. The low protection code encoder may include a Wei encoder. The Wei encoder may be consistent with ITU G.992.1 standard. The system may be configured to encode ADSL information. The modulator may be configured to use at least one diagonally shifted quadrature amplitude modulation constellation. The high protection code encoder may be configured to accept information that includes a least significant bit. The low protection code encoder may be configured to encode information that includes three bits, the three bits excluding a least significant bit.

According to an embodiment of the invention, a method for decoding a quantity of coded electronic information is presented. The method includes at least partially decoding the quantity of coded information using a high protection code decoder to produce a first at least partially decoded quantity of information and at least partially decoding the first at least partially decoded quantity of information using a low protection code decoder to produce a second at least partially decoded quantity of information.

Various optional and preferable features of the above embodiment include the following. The high protection code may include a turbo code or a low-density parity-check code. The quantity of coded information may include information coded by a coding method, the coding method including encoding according to the high protection code, where the high protection code does not limit the asymptotic performance of the coding method. The relation $d_{free,hpc} > D_N^{n+p} d_{free,lpc}$ may be satisfied, where $d_{free,hpc}$ is the free Euclidean distance of the high protection code, $d_{free,lpc}$ is the free Euclidean distance of the low protection code, and $D_N^{n+p}$ is a distance coefficient. The distance coefficient may satisfy $$D_N^{n+p} = 2^{\frac{n+p}{N}}.$$

The quantity of information may be present on a signal that includes 1D lattice-type signal sets or 2D lattice-type signal sets. The distance coefficient may satisfy $D_4^1 = D_4^2 = \sqrt{2}$, and $D_4^3 = D_4^4 = 2$. The quantity of information may be present on a signal that includes a 4D lattice-type signal set. The low protection code may include trellis coded modulation. The low protection code may include a Wei code. The Wei code may be consistent with ITU G.992.1 standard. The quantity of coded information may include ADSL information. The method may include passing a probability from the high protection code decoder to the low protection code decoder.

According to an embodiment of the invention, a system for decoding a quantity of coded electronic information is presented. The system includes a high protection code decoder configured to at least partially decode the quantity of information to produce a first at least partially decoded portion of information and a low protection code decoder configured to at least partially decode the first at least partially decoded portion of information to produce a second at least partially decoded portion of information.

Various optional and preferable features of the above embodiment include the following. The high protection code decoder may include a turbo code decoder or a low-density parity-check code decoder. The system may be configured to accept information encoded by an encoding system that includes a high protection code encoder, where the high protection code encoder does not limit the asymptotic performance of the encoding system. The system may be configured to accept information encoded according to a high protection code and a low protection code, where the relation $d_{free,hpc} > D_N^{n+p} d_{free,lpc}$ is satisfied, where $d_{free,hpc}$ is the free Euclidean distance of the high protection code, $d_{free,lpc}$ is the free Euclidean distance of the low protection code, and $D_N^{n+p}$ is a distance coefficient. The distance coefficient may satisfy $$D_N^{n+p} = 2^{\frac{n+p}{N}}.$$

The quantity of information may be present on a signal that includes 1D lattice-type signal sets or 2D lattice-type signal sets. The distance coefficient may satisfy $D_4^1 = D_4^2 = \sqrt{2}$, and $D_4^3 = D_4^4 = 2$. The quantity of information may be present on a signal that includes a 4D lattice-type signal set. The low protection code decoder may be configured to decode information including trellis coded modulation information. The low protection code decoder may include a Wei decoder. The Wei decoder may be consistent with ITU G.992.1 standard. The system may be configured to decode ADSL information. The high protection code decoder may be configured to pass a probability to the low protection code decoder.

According to an embodiment of the invention, a method of encoding a sequence of bits is disclosed. The method includes encoding a first portion of the sequence of bits according to a turbo code, the first portion of encoded bits including a least significant bit, to produce first encoded bits, encoding a second portion of the sequence of bits according to a trellis code to produce second encoded bits, and mapping a third portion of the sequence of bits, the first encoded bits, and the second encoded bits to at least one symbol.

According to an embodiment of the invention, a system for encoding a quantity of electronic information is disclosed. The system includes means for encoding a first portion of the quantity of information according to a high protection code to produce a first coded portion of information, means for encoding a second portion of the quantity of information according to a low protection code to produce a second coded portion of information, and means for mapping the first coded portion of information, the second coded portion of information, and a third portion of the quantity of information to at least one symbol.

According to an embodiment of the invention, a computer readable medium is disclosed. The computer readable medium contains instructions configured to cause a computer to encode a first portion of a quantity of information according to a high protection code to produce a first coded portion of information, encode a second portion of the quantity of information according to a low protection code to produce a second coded portion of information, and map the first coded portion of information, the second coded portion of information, and a third portion of the quantity of information to at least one symbol.

According to an embodiment of the invention, a method of decoding a sequence of bits is disclosed. The method includes at least partially decoding the sequence of bits using a turbo code decoder to produce a first at least partially decoded sequence of bits and at least partially decoding the first at least partially decoded sequence of bits using a trellis coded modulation decoder to produce a second at least partially decoded sequence of bits.

According to an embodiment of the invention, a system for decoding a quantity of coded electronic information is disclosed. The system includes means for at least partially decoding the quantity of coded information according to a high protection code to produce a first at least partially decoded quantity of information and means for at least partially decoding the first at least partially decoded quantity of information according to a low protection code to produce a second at least partially decoded quantity of information.

According to an embodiment of the invention, a computer readable medium is disclosed. The computer readable medium contains instructions configured to cause a computer to at least partially decode a quantity of coded information according to a high protection code to produce a first at least partially decoded quantity of information and at least partially decode the first at least partially decoded quantity of information according to a low protection code to produce a second at least partially decoded quantity of information.

Still further features and advantages of the present invention are identified in the ensuing description, with reference to the drawings identified below.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which.

DETAILED DESCRIPTION OF THE INVENTION

The following description is intended to convey a thorough understanding of the present invention by providing a number of specific embodiments and details involving Hierarchical Trellis Coded Modulation. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Hierarchical Trellis Coded Modulation (HTCM) is a new multilevel trellis structure introducing a hierarchy between the constituent codes. More particularly, HTCM is a bandwidth-efficient joint multilevel coding and modulation, which enhances the performance of the classical TCM by encoding a hierarchy of component (e.g., trellis) codes. In one embodiment, HTCM is composed of a hierarchy of two component trellis codes with different error correcting capability. In this embodiment, the lower level code is a binary rate-½ parallel concatenated trellis code, commonly known as a turbo code, whereas, for the sake of backward compatibility with the current standard, the second level code is a 16-state 4D Wei code. Certain embodiments of HTCM asymptotically achieve, with a very reasonable complexity, 2.21 dB of relative coding gain compared to the current TCM. Although HTCM may use a turbo component decoder, it appears to be much less complex than any other turbo scheme proposed so far, hence stands as a good candidate for the future generation of ADSL.

Figure 1:
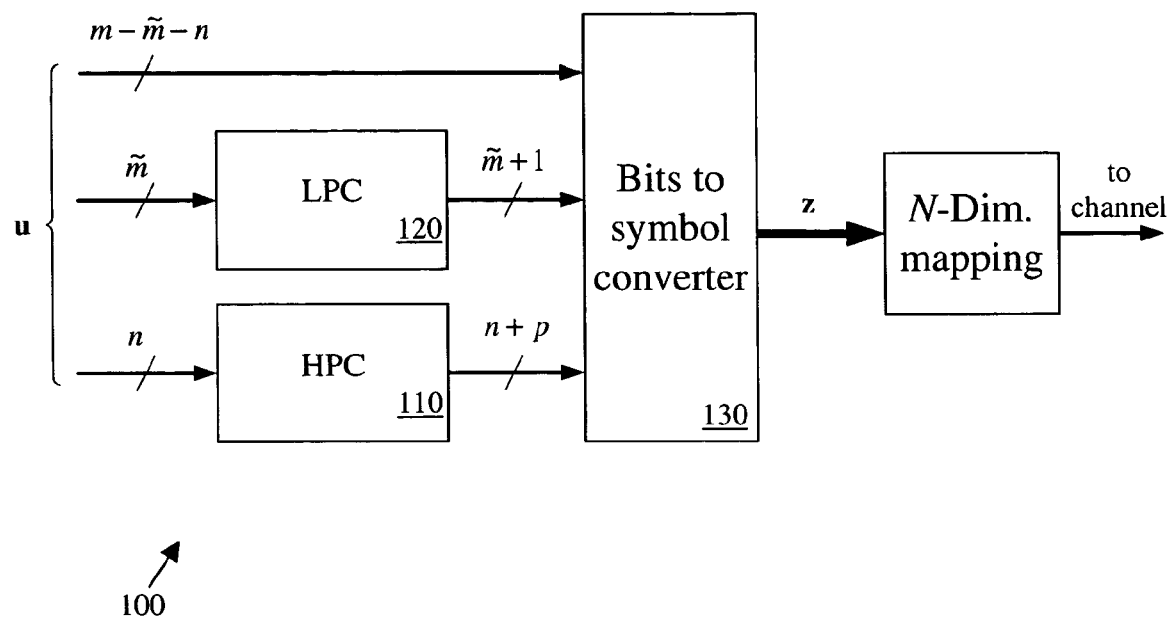
FIG. 1 is a schematic diagram of a general Hierarchical Trellis Coded Modulation (HTCM) encoder embodiment.

FIG. 1 depicts the general structure of an encoder embodiment 100. Encoder 100 includes two component trellis codes offering different degrees of error protection: a High Protection Code (HPC) 110 such as a turbo trellis code and a Low Protection Code (LPC) 120 such as a convolutional code. In TCM, the N-dimensional signal set is partitioned into a sequence of subsets (partition tree) with enlarged intra-subset Minimum Euclidean Distance (MED) ($\Delta_i$) ($\Delta_0 \leq \Delta_1 \leq \ldots \leq \Delta_i \leq \ldots$), where i represents the $i^{th}$ partitioning level labeled by the $i^{th}$ coded bit. The distances $\Delta_i$ (for i≠0) determine in part the free distance, i.e. the coding gain, of the code. HTCM aims to protect the n lower information bit(s) (assigned to the subsets with a small MED) with a HPC. Turbo codes can achieve a coding gain very close to the Shannon bound and are therefore an appropriate choice for HPC 110; however, other HPC codes may be used. High protection indicates that the component HPC does not affect the asymptotic performance of the HTCM code. Thus, above a certain signal-to-noise ratio (SNR), the HTCM performance is limited by the performance of the TCM code with a new increased free distance depending only on large $\Delta_i$'s (with i>n+p). The enlarged free distance results in a few dB gain improvement relative to the TCM component code.

Referring to FIG. 1, the classical rate-$\tilde{m}/\tilde{m}+1$ convolutional code is "shifted-up" by inserting an extra rate n/n+p turbo code applied to the bits $u_1, \ldots, u_n$ of the input information sequence $u=u_1, \ldots, u_{\tilde{m}}$. The coded bits are then converted into a N-dimensional symbol z chosen from a N-dimensional signal set. The N-dimensional signals can be formed by the concatenation of constituent 1D or 2D signals transmitted sequentially to the channel. The Bits To Symbol Converter 130 gathers distinct functions such as logical operations, linear equations, puncturing and/or interleaving.

The asymptotic coding gain $\gamma_{tcm}$ of a classical TCM scheme may be defined as, by way of non-limiting example:

$$\gamma_{tcm} = \frac{d_{free,tcm}^2}{\varepsilon_{tcm}} \bigg/ \frac{\Delta_0^2}{\varepsilon_{unc}}. \tag{1}$$

In equation (1), $\varepsilon_{tcm}$ and $\varepsilon_{unc}$ represent the average energies of the N-dimensional constellations used in the TCM and uncoded schemes, respectively. The term $\Delta_0$ represents the MED between uncoded signals, and $d_{free,tcm}$ stands for the free Euclidean distance of the TCM code. The free Euclidean distance of a TCM code encoding m̃ bits may be expressed as, by way of non-limiting example:

$$d_{free,tcm} = \min\{d_{free}(\tilde{m}), \Delta_{\tilde{m}+1}\}. \quad (2)$$

In equation (2), $d_{free}$ represents the free Euclidean distance of the convolutional code (i.e. the MED between non-parallel transitions in the trellis) and $\Delta_{\tilde{m}+1}$ represents the MED between signals in the subset selected by the m̃ coded bits.

A N-dimensional signal set with a MED $\Delta_0$ may be partitioned into $2^i$ subsets with a MED $\Delta_i = D_N^i \Delta_0$, where $D_N^i$ is a distance coefficient depending on the number i of coded bits and both the dimension and the type of the signal set. For 1D and 2D lattice-type signal sets, $D_N^i$ may be represented as $D_N^i = 2_N^i$. An extension of this expression to higher dimensions (4D, 8D, . . . ) is possible. For example, for 4D lattice-type signal sets, $D_4^1 = D_4^2 = \sqrt{2}$, $D_4^3 = D_4^4 = 2$, etc. The n+p turbo coded bits partition the signal set into smaller subsets with a MED $\Delta_{n+p} = D_N^{n+p} \Delta_0$. The TCM coded bits are then converted to a signal contained in the subset selected by the HPC. Thus, the free Euclidean distance (2) of the TCM code is increased by a factor $D_N^{n+p}$.

In general, the free Euclidean distance $d_{free,hpc}$ of an HPC will satisfy the relation:

$$d_{free,hpc} > D_N^{n+p} d_{free,tcm}. \quad (3)$$

If the free Euclidean distance of an HPC satisfies relation (3), then the asymptotic coding gain of the HTCM scheme can be expressed as, by way of non-limiting example:

$$\gamma_{htcm} = (D_N^{n+p})^2 \times \gamma_{loss} \times \gamma_{tcm}. \quad (4)$$

To avoid decreasing the spectral efficiency, the p extra redundant bits introduced by the HPC may require constellation expansion. The term $\gamma_{loss}$ represents the loss due to such expansion.

To see that equation (4) follows from relation (3), consider the following. The asymptotic coding gain of the HTCM code can be expressed as an enhancement of the TCM coding gain (1) by an extra coding gain brought by the HPC. This relation may be expressed as, by way of non-limiting example:

$$\gamma_{htcm} = \left(\frac{d^2_{free,htcm}}{\varepsilon_{htcm}} \Big/ \frac{d^2_{free,tcm}}{\varepsilon_{tcm}}\right)\underbrace{\left(\frac{d^2_{free,tcm}}{\varepsilon_{tcm}} \Big/ \frac{\Delta_0^2}{\varepsilon_{unc}}\right)}_{\gamma_{tcm}}. \quad (5)$$

In equation (5), the term $\varepsilon_{htcm}$ represents the average energy of the constellation used in the HTCM scheme and $d_{free,htcm}$ denotes the free Euclidean distance of the HTCM code, which may be expressed as, by way of non-limiting example:

$$d_{free,htcm} = \min\{d_{free,hpc}, D_N^{n+p} d_{free,tcm}\}. \quad (6)$$

Given a TCM scheme, maximizing $d_{free,htcm}$ typically consists in maximizing both $d_{free,hpc}$ and $D_N^{n+p}$. To achieve an optimal coding gain, preferably $d_{free,htcm}$ depends only on the free Euclidean distance $d_{free,tcm}$. The "high protection" characteristic of the HPC indicates that its free distance does not limit the asymptotic performance of the HTCM code. In other terms, the arguments of the min function in equation (6) satisfy relation (3). Thus, the ratio $d_{free,htcm}/d_{free,tcm}$ in equation (5) may be simplified to $D_N^{n+p}$. Therefore, the combination of (5) and (3) yields the expression of the HTCM coding gain represented by equation (4), with $\gamma_{loss}$ corresponding to the ratio $\varepsilon_{tcm}/\varepsilon_{htcm}$. This establishes that equation (4) follows from relation (3).

For the sake of homogeneity, because of its trellis-based structure similar to that of convolutional codes, a turbo code may be used for HPC 110. However, other HPC, such as low-density parity-check (LDPC) code, may be used. Preferably, the HPC code 110 satisfies relation (3).

Figure 2:
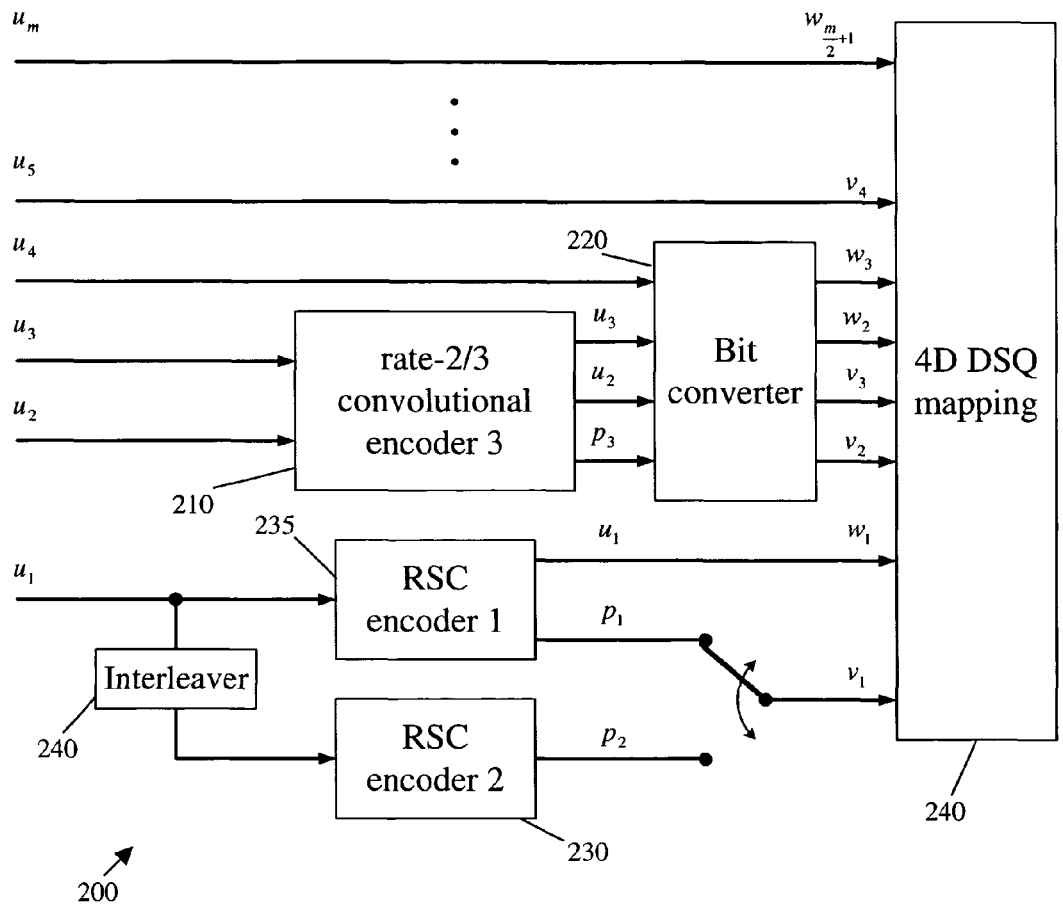
FIG. 2 is a schematic diagram of a HTCM encoder embodiment suitable for use in ADSL.

FIG. 2 is a schematic diagram of a HTCM encoder embodiment 200 suitable for use in ADSL. In particular, the embodiment of FIG. 2 may be used as an alternative to the 16-state 4D Wei code, which is used, for example, as the inner code of asymmetrical digital subscriber line (ADSL) physical layer. In this embodiment, the 16-state 4D Wei code is concatenated with a rate ½ parallel concatenated turbo code. The standard rate-⅔ trellis code is "shifted-up" by inserting a rate-½ turbo code applied to the Least Significant Bit (LSB) $u_1$ of the input information sequence $u=(u_1, \ldots, u_m)$. The coded information is then transmitted using 4D constellations. More particularly, the coded information is transmitted as a sequence of 4D signals chosen from a 4D lattice-type signal set as discussed further below. Certain embodiments asymptotically achieve 1.76 dB of additional coding gain, compared to the original Wei code. Therefore, the HTCM offers an original combination of the error-correcting capability of turbo codes with the bandwidth efficiency of multidimensional coded modulations.

In the rate-m/m+2 encoder of FIG. 2, the input information block $u=(u_1, \ldots, u_m)$ is divided into 3 vectors $u_1 = u_1$, $u_2 = (u_2, u_3, u_4)$ and $u_3 = (u_5, \ldots, u_m)$, each encoded independently by different codes. (The notation $(u_1, \ldots, u_m)$ lists bits from the least to the most significant.) The vectors $u_1$ and $u_2$ are respectively encoded by a turbo and a 16-state 4D Wei code. The vector $u_3$ is left uncoded. The term $p_j$ is referred to as the parity check bit generated by the $j^{th}$ systematic convolutional component encoder. The coded bits are converted into two 2D symbols $$v = \left(v_1, \ldots, v_{\frac{m}{2}+1}\right) \text{ and } w = \left(\omega_1, \ldots, \omega_{\frac{m}{2}+1}\right)$$

that form a 4D point (v, w) mapped on a pair of $$2^{\frac{m}{2}+1}$$

-point 2D constellations.

The turbo code is formed by the parallel concatenation of two identical rate-½ binary recursive systematic convolutional (RSC) encoders 230, 235 separated by a random interleaver 240 with a size 1024 bits. The generator matrix of each component encoder may be represented by [1g(D)], where $g(D) = n(D)/d(D)$ is the generator polynomial of a 16-state convolutional machine. The code is preferably optimized for a lowest bit error probability at high SNRs. Therefore the polynomials $n(D) = 27_8$ and $d(D) = 31_8$ may be used. See S. Benedetto and G. Montorsi, "Design of parallel concatenated convolutional codes," *IEEE Trans. on Communications*, vol. 44, no. 5, pp. 591-600, May 1996 for notation known to those of ordinary skill in the art. The encoder rate is reduced to ½ by puncturing evenly the parity check bits $p_1$ and $p_2$. The punctured parity check information and the systematic information $u_1$ correspond, respectively, to the LSBs $v_1$ and $w_1$ of the symbols v and w.

The bits $(u_2, \ldots, u_m)$ are coded by the 16-state Wei code with 4D constellations. The output $(p_3, u_2, u_3)$ of a rate-⅔ 16-state systematic convolutional code 210 selects the 4D coset to be transmitted. The bit $u_4$ determines the association of two 2D cosets within the 4D coset selected. The bit converter 220 contains a set of linear equations that convert ($p_3$, $u_2$, $u_3$, $u_4$) into two pairs of bits ($v_2$, $v_3$) and ($w_2$, $w_3$) used to select the 2D coset corresponding to the first and second 2D point into the 4D constellation, respectively. The remaining bits ($u_5, \ldots, u_m$) are uncoded and correspond directly to $v_i$'s and $w_i$'s with i>4. The following provide background information on the convolutional encoder and the bit converter: International Telecommunication Union (ITU), "Draft new recommendation G.992.1: Asymmetrical digital subscriber line (ADSL) transceivers," July 1999, G.992.1 editor final version and L. F. Wei, "Trellis-coded modulation with multidimensional constellations," IEEE Trans. Inform. Theory, vol. 33, no. 4, pp. 483-501, July 1987.

Figure 3:
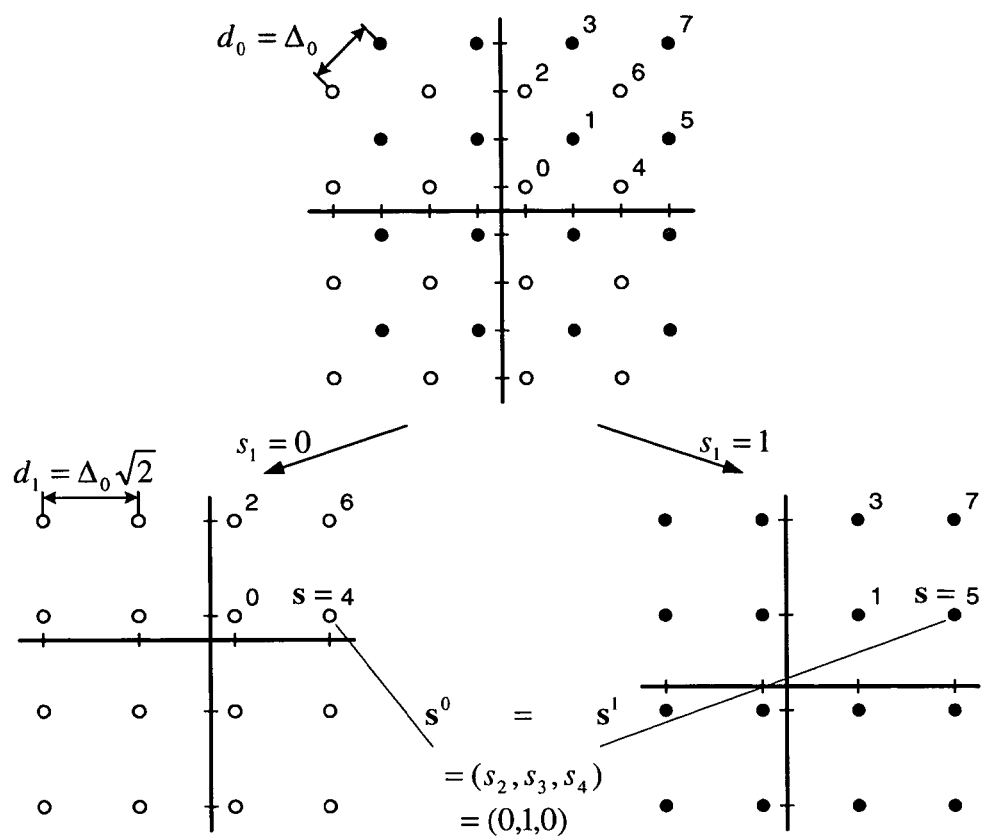
FIG. 3 illustrates a subfamily partitioning embodiment for a five-bit Diagonally Shifted QAM (DSQ) constellation.

The constellation mapping portion 240 of FIG. 2 maps the coded symbols v and w onto a pair of 2D Diagonally Shifted QAM (DSQ) constellations. This mapping extends the signal set originally used in the TCM code to a 4D lattice-type signal set composed of a pair of constituent 2D DSQ constellations. A $2^n$-point DSQ constellation includes two identical $2^{n-1}$-point QAM constellations diagonally shifted in opposite directions in the 2D space. By defining $s^0=s^1$ as labels of two points with the same position in each QAM constellation, their label in the DSQ constellation becomes $s=(s_1=i, s^i)$, for $i \in \{0, 1\}$. Therefore, each QAM forms a $2^{n-1}$-point subfamily of the DSQ, labelled by $s_1$ (the LSB of s). FIG. 3 depicts an example subfamily partitioning embodiment of a 5 bit DSQ constellation.

The information bit $u_1$ coded by the turbo code is associated to the least significant bits $v_1$ and $w_1$ of the 2D symbols v and w. Then $v_1$ and $w_1$ are mapped separately to the LSB of their respective DSQ constellation. The remaining bits ($v_2$, $w_2$, $v_3, \ldots$) corresponding to the bits encoded by the classical TCM are mapped on the two 2D subfamilies selected by $v_1$ and $w_1$. That is, the two coded bits $v_1$ and $w_1$ select the 4D subfamily in which the remaining bits $v_2$, $w_2$, $v_3, \ldots$, $$w_{\frac{m}{2}+1},$$

corresponding to the bits coded by the TCM code, determine the signal point to be transmitted. The minimum Euclidian distance $d_1$ between points within a subfamily (in which the TCM is decoded) is thus increased by a factor $\sqrt{2}$.

To guarantee backward compatibility with the current ADSL coding scheme, the QAM constellations defined in the ITU standard are reused to form the DSQ constellations. For n odd, the average energy $\epsilon_n$ of the DSQ constellation may be represented as, by way of non-limiting example:

$$\varepsilon_n = \frac{d_0^2(2^{n+1} - 1)}{12}. \tag{7}$$

In equation (7), $d_0$ represents the normalized minimum distance. For a large value of n, the '−1' in equation (7) may be neglected, to yield, by way of non-limiting example:

$$\varepsilon_n \approx \frac{d_0^2 2^{n+1}}{3}. \tag{8}$$

For n even, the DSQ constellation is formed by a pair of cross-QAM constellations. For example, the ADSL standard suggests using $2^n$-point cross-QAM constellations obtained by the expansion of the $2^{n-1}$-point square-QAM constellations. A generic expression of $\epsilon_n$ may be approximated by equation (8) for a large n (e.g., n>6).

Generally, the average energy of a 4D constellation can be expressed as the sum of the energies of its 2D component constellations. This relation may be represented as, by way of non-limiting example:

$$\epsilon_{4D,n+m} = \epsilon_{2D,n} + \epsilon_{2D,m}. \tag{9}$$

Note that the number of signal points in each constituent 2D constellation can be different (e.g., n≠m). This occurs, for example, when a system transmitting 2D signals with a n bits/s/Hz spectral efficiency is coded by a 4D TCM code. To remain bandwidth efficient, the code expands one of the constellation for mapping the extra redundant bit (hence m=n+1).

Figure 4:
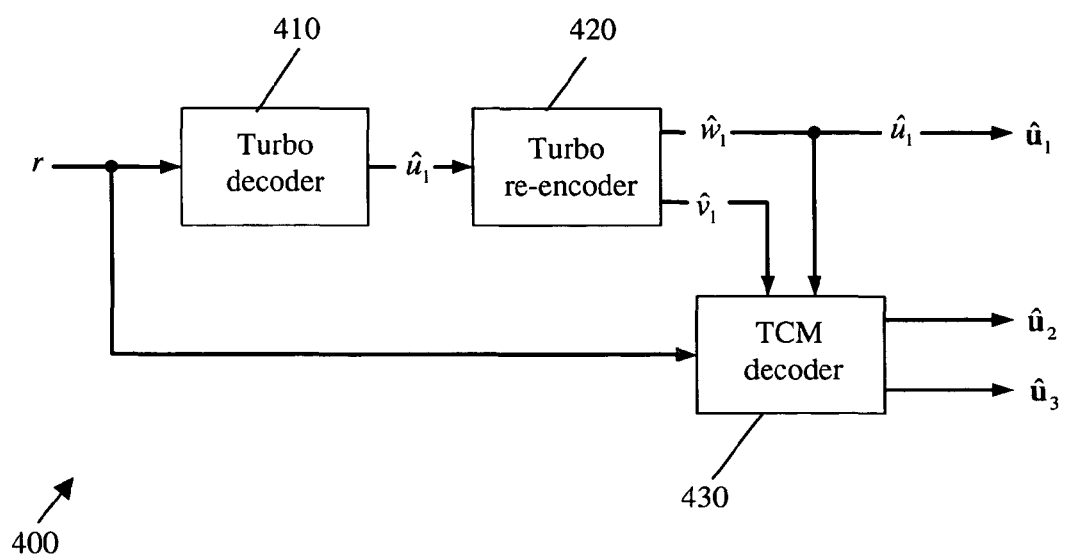
FIG. 4 is a schematic diagram of a HTCM decoder embodiment.

FIG. 4 is a schematic diagram of a HTCM Multi-Stage Decoder (MSD) embodiment 400. The decoding procedure employs a sequential decoding of the component codes by following a certain hierarchy. The $i^{th}$ decoding stage calculates the a posteriori probabilities $p_i(u_i|r, \hat{u}_1, \ldots, \hat{u}_{i-1})$ for all the combinations of $u_i$, then makes a hard decision to select the most probable transmitted information according to, by way of non-limiting example:

$$\hat{u}_i = \underset{u_i}{\text{Argmax}} \{p_i(u_i | r, \hat{u}_1, \ldots, \hat{u}_{i-1})\}. \tag{10}$$

The results of this decision are passed as an a posteriori information to the next stage.

The number of coding levels of the HTCM scheme is reduced to three (where one level is uncoded). The hierarchical decoding illustrated by FIG. 4 is as follows. The turbo code is decoded first at 410. Next, the estimated information bit $\hat{u}_1$ is re-encoded at 420 into a set $(\hat{v}_1, \hat{w}_1)$ that determines the 4D subfamily in which the next decoding stage is performed. The subfamily's a posteriori information is fed to the trellis decoder 430 that determines, within the selected 4D subfamily (QAMs), the most probable transmitted 4D coset $\hat{u}_2$. The last stage simply decides the uncoded bits within the estimated coset and subfamily. Note that this stage may be performed jointly with the trellis decoding, during the branch metric computation.

The turbo component decoder 410 accepts a block of N received soft 4D symbols r, where N is the size of the interleaver. Therefore, it introduces an extra delay increasing the code's latency.

Certain analytic bounds of an exemplary HTCM embodiment are calculated presently. We first present an expression for asymptotic coding gain $\gamma_{tcm}$ of a classical TCM scheme with an emphasis on dimensionality. Specifically, the asymptotic coding gain $\gamma_{tcm}$ of a classical TCM scheme may be represented as, by way of non-limiting example:

$$\gamma_{tcm} = \frac{d_{free,tcm}^2 / \varepsilon'_{4D}}{d_{min}^2 / \varepsilon''_{4D}} \tag{11}$$

In equation (11), $d_{min}$ represents the minimum distance between signals in the uncoded constellation and $d_{free,tcm}$ represents the free distance of the trellis code. The terms $\epsilon'_{4D}$ and $\epsilon''_{4D}$ represent the average energies of the trellis coded and uncoded transmitted 4D QAM constellations, respectively. Similarly, by considering for purpose of illustration a perfect decoding of the turbo code, the asymptotic coding gain of the HTCM may be expressed as, by way of non-limiting example:

$$\gamma_{htcm} = \frac{d^2_{free,htcm}/\varepsilon'_{4D}}{d^2_{free,tcm}/\varepsilon'_{4D}} \frac{d^2_{free,tcm}/\varepsilon'_{4D}}{d^2_{min}/\varepsilon''_{4D}} = \frac{d^2_{free,htcm}}{d^2_{free,tcm}} \frac{\varepsilon'_{4D}}{\varepsilon_{4D}} \gamma_{tcm}. \tag{12}$$

In equation (12), the term $d_{free,htcm}$ represents the free distance of the HTCM's trellis code and $\varepsilon_{4D}$ represents the average energy of the transmitted 4D DSQ constellation. The free distance, represented by $d_{free,htcm}$, is increased by a factor $\sqrt{2}$ compared to $d_{free,tcm}$ (i.e., $d_{free,htcm}=\sqrt{2}d_{free,tcm}$), which results in 3 dB of additional gross coding gain. Therefore, equation (12) may be rewritten as, by way of non-limiting example:

$$\gamma_{htcm}(dB) = 3 + \gamma_{loss}(dB) + \gamma_{tcm}(dB). \tag{13}$$

To avoid decreasing the spectral efficiency, the extra redundant bit introduced by the turbo code preferably expands a constellation by one more bit than in the TCM. The term $\gamma_{loss}$ represents the loss due to this expansion. The term $\gamma_{loss}$ corresponds to the ratio between the average energies $\varepsilon'_{4D}$ and $\varepsilon_{4D}$, which may be approximated as, by way of non-limiting example and for an exemplary embodiment:

$$\varepsilon'_{4D} = \frac{1}{3}(\varepsilon'_n + 2\varepsilon'_{n+1}) \text{ and } \varepsilon_{4D} = \varepsilon_{n+1}. \tag{14}$$

In equation (14), the terms $\varepsilon'_N$ and $\varepsilon_N$ represent the average energies of the $2^n$-point 2D QAM and DSQ constellations, respectively. The expressions of $\varepsilon'_{4D}$ and $\varepsilon_{4D}$ in equation (13) are given for a spectral efficiency of n bits/s/Hz. Therefore, an upper bound for $\gamma_{loss}$ may be approximated as, by way of non-limiting example:

$$\gamma_{loss} = \frac{\varepsilon'_n + 2\varepsilon'_{n+1}}{3\varepsilon_{n+1}} \xrightarrow[n \to \infty]{} -0.79 \text{ dB}. \tag{15}$$

For n large, the average energy $\varepsilon'_n$ of a QAM constellation may be approximated by equation (8), which yields $\varepsilon'_n \approx \varepsilon_n$ and $\varepsilon_{n+1} \approx 2\varepsilon_n$, hence $\gamma_{loss}$ is =−0.79 dB. Therefore, for an exemplary coding embodiment, the upper-bound behavior of the asymptotic coding gain of the overall code with a large constellation size may be approximated as, by way of non-limiting example:

$$\gamma_{htcm}(dB) \xrightarrow[n \to \infty]{} \gamma_{tcm}(dB) + 2.21 \text{ dB}. \tag{16}$$

For example, for a spectral efficiency of 4 bits/s/Hz (n=4), the computation of $\gamma_{loss}$ requires the knowledge of the average energies $\varepsilon'_4 = 5d_0^2/2, \varepsilon'_5 = 5d_0^2$ and $\varepsilon_5 = 63d_0^2/12$ of the 16-point square-QAM, 32-point cross-QAM and 32-point DSQ constellations. Equation (15) yields $\gamma_{loss} = -1$ dB, i.e., 2 dB of asymptotic relative coding gain with the TCM code only, which is confirmed by simulation results given below.

Certain analytic bounds for the embodiment of FIG. 2 are calculated presently. In general, turbo codes satisfy equation (3), hence $d_{free,htcm}/d_{free,tcm} = D_N^{n+p} = D_4^2 = \sqrt{2}$, which results in 3.01 dB of additional gross coding gain. Using equation (4), therefore, the asymptotic coding gain of the embodiment of FIG. 2 may be written as, by way of non-limiting example:

$$\gamma_{htcm}[dB] = 3.01 + \gamma_{loss}[dB] + \gamma_{tcm}[dB]. \tag{17}$$

The expression of $\gamma_{loss}$ involves the average energies $\varepsilon_{tcm}$ and $\varepsilon_{htcm}$. Using equation (9), for a n bits/s/Hz spectral efficiency with n an integer, those energies may be expressed as, by way of non-limiting example:

$$\varepsilon_{tcm} = \varepsilon'_{2D,n} + \varepsilon'_{2D,n+1} \text{ and } \varepsilon_{htcm} = 2\varepsilon'_{2D,n+1} \tag{18}$$

In equation (18), the terms $\varepsilon'_{2D,n}$ and $\varepsilon_{2D,n}$ represent respectively the average energies of the $2^n$-point 2D QAM and DSQ constellations. The analytical expression of $\gamma_{loss}$ may be represented as, by way of non-limiting example:

$$\gamma_{loss} = \frac{\varepsilon'_{2D,n} + 2\varepsilon'_{2D,n+1}}{2\varepsilon_{2D,n+1}} \xrightarrow[n \to \infty]{} -1.25 \text{ dB}. \tag{19}$$

For n large, the average energy $\varepsilon'_{2D,n}$ of a QAM constellation may be approximated by equation (8), which yields $\varepsilon'_{2D,n} \approx \varepsilon_{2D,n}$ and $\varepsilon_{2D,n+1} \approx 2\varepsilon_{2D,n}$, hence $\gamma_{loss} = -1.25$ dB. Therefore, the behavior of the asymptotic coding gain of the overall exemplary code with a large constellation size may be represented as, by way of non-limiting example:

$$\gamma_{htcm}[dB] \xrightarrow[n \to \infty]{} \gamma_{tcm}[dB] + 1.78 \text{ dB}. \tag{20}$$

Note that equation (20) is given for integer n. For non-integer n, the additional 1.76 dB asymptotic coding gain may be greater.

Figure 5:
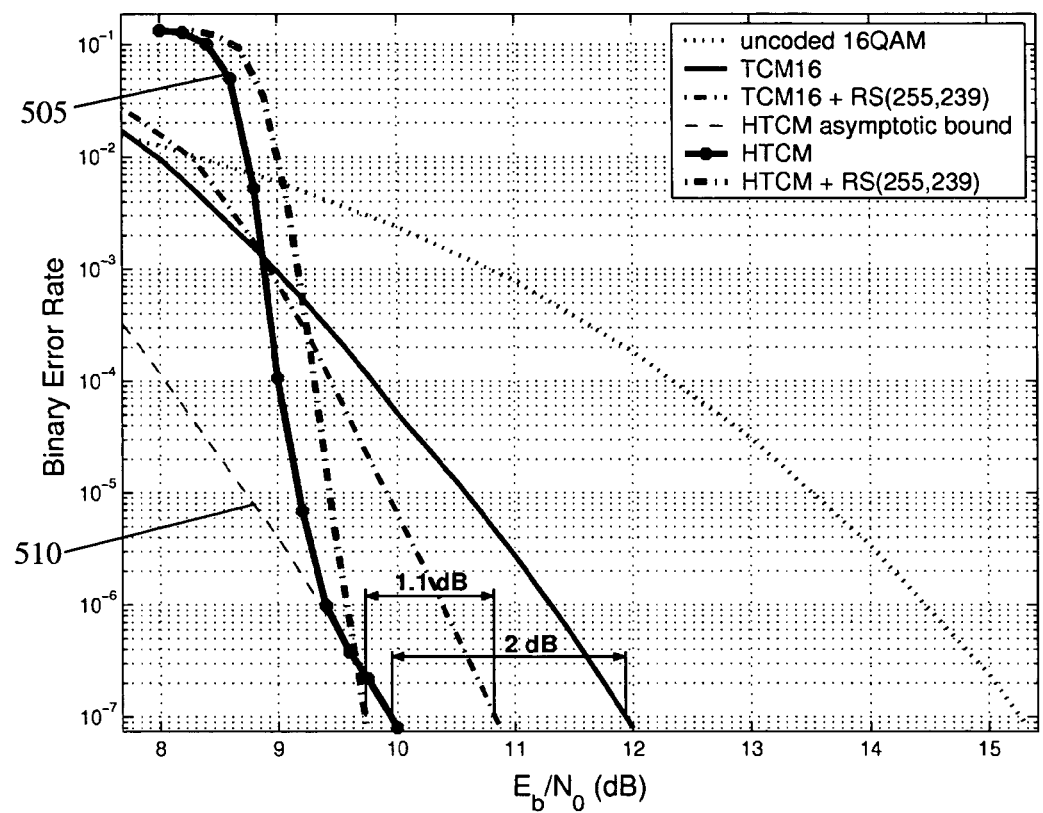
FIG. 5 is a graph depicting 4 bits/s/Hz TCM and HTCM performance curves with and without serial concatenation with a RS code.

Towards developing the graph of FIG. 5 and by considering for illustrative purposes a perfect equalization, each constituent tone of a DMT symbol may be modeled as a narrow-band flat subchannel with Additive White Gaussian Noise (AWGN). Each tone is loaded first with the coded bits (e.g., 3 in some HTCM embodiments), then with the uncoded bits up to reach the subchannel's bit capacity, depending in part on the SNR per tone and the code's gain. The number of uncoded bits per tone determines the number of intra-coset points, which basically does not affect the error correcting capability of the turbo or the trellis component code. Therefore, the estimation of the code's performance may be simplified by loading uniformly all the tones (same constellation size), which is equivalent to considering a single carrier transmission over an AWGN channel.

FIG. 5 compares, for a spectral efficiency of 4 bits/s/Hz, the simulated coding gain over an AWGN channel of a HTCM scheme and the standard TCM scheme, with and without the serial concatenation with a RS(255,239) code (fast mode configuration). The parameters of the HTCM encoder are those suggested above with respect to FIG. 2. Each 4D symbol (v, w) is mapped to a pair of 5 bits DSQ constellations alternatively transmitted over an AWGN channel with a one-sided spectral density $N_0$. The received signal is decoded by the hierarchical MSD of FIG. 4, in which the turbo component decoder performs 8 iterations.

The net coding gain as depicted in FIG. 5 achieved at a BER of $10^{-7}$ is found to be 5.3 dB, i.e., 2 dB of relative coding gain with the TCM, which corresponds to an asymptotical relative gain derived above. The behavior of the HTCM's performance curve 505 is characteristic of turbo codes. It may be divided in three distinct regions: 1) a non-convergence region (before 8.5 dB) in which the BER is very high, 2) a waterfall region characterized by a very steep descent to a BER around $10^{-6}$, and 3) an error floor region, below a BER of $10^{-6}$, where the performance curve meets the asymptotical bound.

The asymptotical bound 510 was simulated for purpose of illustration by considering a perfect decoding of the bit $u_1$ in the hierarchical MSD. This bound is quite parallel to the TCM's performance curve shifted from 2 dB toward the lower SNRs.

The serial concatenation with the RS outer code corrects the change of slope resulting from the error floor. On the other hand, it reduces the relative coding gain to 1.1 dB. This gain may be improved by acting on the parameters of the turbo component code as discussed far below.

Figure 6:
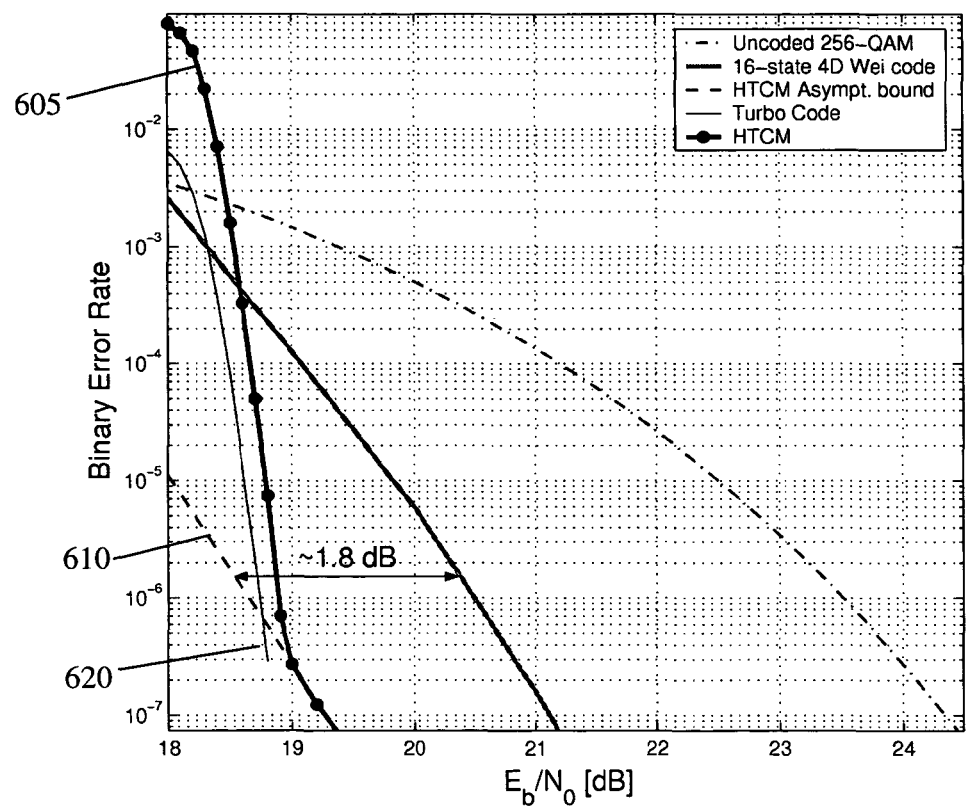
FIG. 6 is a graph depicting 8 bits/s/Hz TCM and HTCM performance curves.

FIG. 6 shows the simulated coding gain over an additive white Gaussian noise (AWGN) channel of the 16-state 4D Wei scheme and the HTCM scheme discussed above in reference to FIG. 2. FIG. 6 considers for illustrative purposes a "perfect turbo" decoding ($\hat{u}_1 = u_1$). For a fair comparison between the two schemes, all performances were simulated with 8 bits/s/Hz spectral efficiency. Each TCM coded 4D symbol is mapped to an asymmetric 4D QAM constellation formed by the concatenation of a 256-point (8 bits) 2D square-QAM constellation and a 512-point (9 bits) 2D cross-QAM constellation. The shape and labeling of the $2^n$-point 2D QAM constellations follows the ADSL standard. The 2D signal points are then alternatively transmitted over an AWGN channel with a one-sided spectral density $N_0$. The TCM decoder uses a soft-input maximum likelihood decoding algorithm (Viterbi). The HTCM scheme encodes the information bits into a sequence of 4D symbols [v, w] mapped to a pair of 512-point 2D DSQ constellations. The received signal is decoded by the hierarchical MSD discussed above in reference to FIG. 4, in which the turbo component decoder performs 6 iterations.

The HTCM coding gain achieved at a BER of $10^{-7}$ is 5.1 dB, i.e., 1.8 dB of additional coding gain relative to the Wei code, which corresponds to the asymptotic relative gain derived above an exemplary embodiment. The behavior of the HTCM performance curve 605 of FIG. 6 may be divided in three distinct regions: 1) a non-convergence region (for a SNR per bit $E_b/N_0$ below 18 dB), in which the BER is very high, 2) a waterfall region characterized by a very steep descent to a BER around $3.10^{-7}$, and 3) a saturation region, below a BER of $3.10^{-7}$, where the performance curve meets the asymptotic bound.

The asymptotic bound 610 in FIG. 6 was simulated by considering for illustrative purposes a perfect decoding of the bit $u_1$ in the MSD. This bound is quite parallel to the TCM performance curve shifted from 1.8 dB toward the lower SNRs. The thin solid line 620 corresponds to the turbo code performance curve considering a perfect decoding of the upper levels. The upper-bound of the union of the turbo code performance curve and the asymptotic bound corresponding to the shifted TCM form a good estimate of the soft decoding performance. Further, the HTCM component codes do not generally offer the same error correcting capability. Therefore, an improvement of the hard decoding <0.15 dB in the waterfall region may be expected for certain embodiments (this interval may be reduced by interleaving the trellis coded bits $v_2$, $v_3$, $w_2$ and $w_3$). For a BER below $3.10^{-7}$ (rsp., $10^{-6}$ for the embodiment of FIG. 5) the bound is already reached with a hard decoding, hence no additional gain is expected with a soft decoding. Below this BER, therefore, there is a numerical computation advantage in that hard information is more easily stored and manipulated by computers.

The high error correcting capability of the turbo code might allow the HTCM to reach its asymptotic bound for low BERs. To that end, the following heuristic design considerations for the turbo component code are presented.

The upper-bound of the union of the turbo code's performance curve and the asymptotic bound corresponding to the shifted TCM forms a more accurate bound for the HTCM. Toward achieving the asymptotic coding gain given in equation (16), the turbo encoder's parameters are preferably chosen in a way that rejects the well-known error floor phenomenon below the BER required. The asymptotic behavior of the turbo code at high SNR is dictated in part by the minimum distance of the code, which depends in part on the RSC code's memory and the interleaver size. For instance, the choice of a 16-state RSC encoder and a size N=1024 bits interleaver guarantees a turbo's error floor below the asymptotic bound for a BER of $10^{-7}$.

If the HTCM is used as a single code, by "releasing" the parameters of the turbo component code, the coding gain remains optimal as long as its performance curve reaches the asymptotic bound above the required BER.

By replacing the inner code of the ADSL coding chain with the HTCM, the outer RS code corrects the HTCM's error floor effect below a BER of $\sim 10^{-5}$. However, the steepness of the performance curve in the waterfall region limits the performance of the RS code: almost no additional coding gain is generally expected in this region. Some solutions to increase this gain intend to reject the waterfall effect to lower SNRs by acting on the parameters of the turbo component code (such as the interleaver size or the number of iterations in the decoder). The coding gain is generally improved by increasing the code's complexity and/or latency.

In general, increasing the constraint length of the state machine for TCM will improve the coding gain. Although turbo codes appear to an computationally expensive alternative, we show herein that the HTCM code can be less complex than an equivalent TCM code with the same asymptotic gain.

For the sake of simplification, we neglect the encoder's complexity and focus on the complexity $C_{dec}$ of the hierarchical decoder, which may be expressed as the sum of the complexities $C_{trellis}$ of the 16-state trellis decoder and $C_{turbo}$ of the binary iterative turbo decoder, approximated as, by way of non-limiting example:

$$C_{dec} = C_{trellis} + C_{turbo} \approx C_{VA}(16,4) + 2N_i \times C_{MAP}(16,2). \quad (21)$$

In equation (21), $C_{VA}(m, n)$ and $C_{MAP}(m, n)$ correspond to the complexities of the m-state, n-path per node Viterbi and maximum a posteriori (MAP) algorithms, respectively. The term $N_i$ represents the number of iterations of the iterative turbo decoder (composed of two MAP component decoders). By using a log-version of the MAP algorithm, we may use the approximation $C_{MAP}(m, n) \approx 2C_{VA}(m, 2n)$, which simplifies equation (21) to $C_{dec} \approx (4N_i+1) \times C_{VA}(16, 4)$. Compared to the complexity in $8N_i \times C_{MAP}(16, 2)$ of an equivalent 16-state 4D TTCM scheme encoding 4 bits, $C_{dec}$ is roughly 4 times less complex.

The simulation results given above with respect to FIG. 5 consider $N_i=8$. The effect of reducing $N_i$ to 6 and 4 iterations results in a loss of performance, in the waterfall region, of respectively 0.05 and 0.15 dB. Per contra, the complexity is reduced by a factor 4/3 to 2.

More generally, by using a log-version of the MAP algorithm max*–Log–MAP), we may use an approximation expressed as, by way of non-limiting example:

$$4C_{MAP}(m,2) \approx 7C_{VA}(m,4). \quad (22)$$

The relation (22) compares the number of operations necessary to compute one step in the trellis. We consider one operation for an addition and two operations for a max* operation. Relation (22) simplifies equation (21) to $C_{dec} \approx (3.5N_i+1) \times C_{VA}(16, 4)$.

TABLE I

COMPARISON OF THREE ALTERNATE TRELLIS CODES TO THE 16-STATE 4-DIMENSIONAL WEI CODE.

| Trellis Code | Number of states | Constellation mapping | $d2/\_02$ | Coded info. [bits/4D] | Code rate | Asympt. coding gain [dB] | Relative complexity |
|---|---|---|---|---|---|---|---|
| TCM | 16 | QAM | 4 | 3 | m/m + 1 | 4.26* | 1 |
| TCM | 128 | QAM | 6 | 5 | m/m + 1 | 6.02 | 32 |
| HTCM | 16 | DSQ | 8 | 4 | m/m + 2 | 6.02 | $3.5N_i + 1$ |
| TTCM | 16 | QAM | 16 | 4 | m/m + 4 | 6.02 | $14N_i$ |

*For transmitting 2n information bits in an asymmetric 4D QAM formed by two n and (n + 1) bits 2D QAMs.

Table I lists the characteristics of three alternate codes (with identical asymptotic coding gains) to the present 16-state Wei code embodiment of HTCM. For $N_i \leq 8$, the HTCM code is less complex than the optimal 128-state 4D TCM code proposed in G. Ungerboeck, "Trellis coded modulation with redundant signal sets—Part II: State of the art," IEEE Commun. Mag., vol. 25, no. 2, February 1987. The simulation results presented above with respect to FIG. 6 consider $N_i=6$, and the effect of reducing $N_i$ to 4 iterations results in a performance loss of 0.05 dB in the waterfall region.

The multilevel structure of HTCM benefits from two distinct decoding modules providing a scalable versatile architecture suitable for various multi-rate applications. The flexibility of HTCM includes the following assets:

1) Backward compatibility: By shifting the trellis code, a system featuring a mandatory TCM code may be upgraded to an HTCM code without revolutionizing the overall code structure. The hierarchical decoder preserves the Viterbi decoder (suggested by the standard) that ensures interoperability with every standard system. The turbo code may be then considered as an "accelerator" aimed to enhance the performance of a non-standard system exclusively composed of proprietary devices designed by the same constructor. Conversely, a system featuring an HTCM code may easily fall back to a standard TCM code by switching off the turbo component code. That is, HTCM maintains a 100%-compatible fallback mode into the original trellis structure. Thus, HTCM provides new multilevel architectures and decoding schemes that enhance a given TCM, while being able to fall back to the original trellis structure. The backward compatibility feature eases interoperability between HTCM upgraded modems and existing TCM technologies. Whatever the broadband field (wireless, satellite or wired), service providers usually consider fall back compatibility as a strong economical asset.

2) A pure turbo code: For very low SNRs, some applications may use small constellations (with few points) such as BPSK or QPSK. Thus, the HTCM structure can be reduced to a pure turbo code. For example, the embodiment referred to above in relation to FIG. 2 can be downscaled to the single rate ½ turbo code that achieves ~9 dB of coding gain, which significantly increases the service connectivity.

Accordingly, HTCM stands as a good transitional alternative for improving both performance and versatility of the celebrated TCM, before envisaging any complex all-turbo technique.

HTCM achieves the appropriate compromise between coding gain and complexity required to challenge the efficient 16-state 4D Wei code presently used as inner code in ADSL-DMT systems. HTCM unique features stem from, on the one hand, the shifted TCM that keeps backward compatibility and, on the other hand, the high protection of the LSB by a turbo code. Certain embodiments may achieve up to 2.21 dB of net relative coding gain (other embodiments generally achieve 1.76 dB asymptotically) compared to the TCM scheme, at the expense of a realistic complexity increase, implementation wise. Such coding gain improvements may be realized at the expense of only one fourth of the TTCM's complexity. Thus, HTCM offers a better compromise between coding gain and complexity than the TTCM solutions proposed so far, encoding 2 bits per 2D symbol. That is, the complexity increase of HTCM compared to higher-order trellis or full turbo schemes is relatively small, yet HTCM provides a significant coding gain advantage. HTCM opens the path of generic multi-stage shifted TCM schemes that combine codes of different degrees of protections, offering more efficient coding solutions for ever-demanding broadband communications.

Other benefits of HTCM include modularity, bandwidth efficiency, simplicity and substantial gain enhancement. These benefits present HTCM as a better alternative that can be applied to range of broadband communication fields such as wireless, satellite and wired systems.

Embodiments of the present invention may be implemented in hardware, firmware, software, or any combination thereof. Standard computer hardware or software programming techniques may be used. As used herein, the terms "encoder" and "decoder" encompass, by way of non-limiting example, any, or a combination, of hardware, firmware, and software.

The equations contained in this disclosure are illustrative and representative and are not meant to be limiting. Alternate equations may be used to represent the same phenomena described by any given equation disclosed herein. In particular, the equations disclosed herein may be modified by adding additional terms, higher-order terms, or otherwise refining the presentation, using different names for constants or variables, or using different expressions. Other modifications, substitutions, replacements, or alterations of the equations may be performed.

Other embodiments, uses, and advantages of the invention will be apparent to those skilled in the art from consideration of the specification and practice of the invention disclosed herein. The specification and drawings should be considered exemplary only, and the scope of the invention is accordingly intended to be limited only by the following claims and equivalents thereof.

What is claimed is:

1. A method for decoding a quantity of coded electronic information, the method comprising:

at least partially decoding the quantity of coded information using a high protection code decoder to produce an estimated information bit;
re-encoding the estimated information bit for a next decoding stage to be performed; and
at least partially decoding the re-encoded estimated information bit using a low protection code decoder to produce an estimation of a vector to be transmitted.

2. The method of claim 1 wherein the high protection code is selected from the group consisting of: a turbo code and a low-density parity-check code.

3. The method of claim 1 wherein the quantity of coded information comprises information coded by a coding method, the coding method including encoding according to the high protection code, wherein the high protection code does not limit the asymptotic performance of the coding method.

4. The method of claim 1 wherein the quantity of information is present on a signal comprising a 4D lattice-type signal set.

5. The method of claim 1 wherein the low protection code comprises trellis coded modulation.

6. The method of claim 1 wherein the low protection code comprises a Wei code.

7. The method of claim 6 wherein the Wei code is consistent with ITU G.992.1 standard.

8. The method of claim 1 wherein the quantity of coded information comprises ADSL information.

9. The method of claim 1 further comprising passing a probability from the high protection code decoder to the low protection code decoder.

10. A system for decoding a quantity of coded electronic information, the system comprising:
a high protection code decoder configured to at least partially decode the quantity of information to produce an estimated information bit;
a re-encoder configured to re-encode the estimated information bit for a next decoding stage to be performed; and
a low protection code decoder configured to at least partially decode the re-encoded estimated information bit to produce an estimation of a vector to be transmitted.

11. The system of claim 10 wherein the high protection code decoder is selected from the group consisting of: a turbo code decoder and a low-density parity-check code decoder.

12. The system of claim 10 wherein the system is configured to accept information encoded by an encoding system comprising a high protection code encoder, wherein the high protection code encoder does not limit the asymptotic performance of the encoding system.

13. The system of claim 10 wherein the quantity of information is present on a signal comprising a 4D lattice-type signal set.

14. The system of claim 10 wherein the low protection code decoder is configured to decode trellis coded modulation information.

15. The system of claim 10 wherein the low protection code decoder comprises a Wei decoder.

16. The system of claim 15 wherein the Wei decoder is consistent with ITU G.992.1 standard.

17. The system of claim 10 configured to decode ADSL information.

18. The system of claim 10 wherein the high protection code decoder is configured to pass a probability to the low protection code decoder.

19. A method for decoding electronic information comprising:
decoding a first part of the electronic information encoded with a first code using a first decoder to obtain an estimated information bit, wherein the first code does not affect asymptotic performance of the method;
re-encoding the estimated information bit for a second decoding stage to be performed; and
decoding a second part of the electronic information encoded with a second code using a second decoder to produce an estimated vector to be transmitted, wherein the second code has a different degree of error protection than the first code.

20. The method of claim 19, wherein the first code has a greater degree of error protection than the second code.

21. The method of claim 19, wherein the re-encoded estimated information bit is combined with the information decoded at the second decoder.

22. The method of claim 19, wherein the first decoder is configured to pass a probability to the second decoder.

23. The method of claim 19, wherein the first code comprises a turbo code or a low-density parity-check code.

24. The method of claim 19, wherein the second code comprises a trellis coded modulation code or a Wei code.

25. The method of claim 19, wherein the first part of the electronic information is a least significant bit of the electronic information.

26. The method of claim 25, wherein the second part of the electronic information is a next three significant bits of the electronic information.

27. A system for decoding electronic information comprising:
a first decoding stage to decode a first part of the electronic information encoded with a first code to obtain an estimated information bit, wherein the first code does not affect asymptotic performance of the method;
a re-encoding stage configured to re-encode the estimated information bit for a second decoding stage to be performed; and
the second decoding stage to decode a second part of the electronic information encoded with a second code to produce an estimated vector to be transmitted, wherein the second code has a different degree of error protection than the first code.

28. The system of claim 27, wherein the first code has a greater degree of error protection than the second code.

29. The system of claim 27, wherein the re-encoded estimated information bit is combined with the information decoded at the second decoding stage.

30. The system of claim 27, wherein the first decoding stage is configured to pass a probability to the second decoding stage.

31. The system of claim 27, wherein the first code comprises a turbo code or a low-density parity-check code.

32. The system of claim 27, wherein the second code comprises a trellis coded modulation code or a Wei code.

33. The system of claim 27, wherein the first part of the electronic information is a least significant bit of the electronic information.

34. The system of claim 33, wherein the second part of the electronic information is a next three significant bits of the electronic information.

* * * * *

UNITED STATES PATENT AND TRADEMARK OFFICE
CERTIFICATE OF CORRECTION

PATENT NO. : 8,418,018 B2
APPLICATION NO. : 12/565939
DATED : April 9, 2013
INVENTOR(S) : Pons et al.

It is certified that error appears in the above-identified patent and that said Letters Patent is hereby corrected as shown below:

On the Title Page, in Item [56], under "OTHER PUBLICATIONS", in Column 2, Line 1, delete ""Rotaionally" and insert -- "Rotationally --, therefor.

On the Title Page, in Item [56], under "OTHER PUBLICATIONS", in Column 2, Line 2, delete "SAC-2" and insert -- SAC-2, --, therefor.

On Title Page 2, in Item [56], under "OTHER PUBLICATIONS", in Column 2, Line 1, delete "Bengtsson "Trellis Coding in a Descrete" and insert -- Bengtsson, "Trellis Coding in a Discrete --, therefor.

On Title Page 2, in Item [56], under "OTHER PUBLICATIONS", in Column 2, Line 4, delete "36" and insert -- 36, --, therefor.

On Title Page 2, in Item [56], under "OTHER PUBLICATIONS", in Column 2, Line 6, delete "50" and insert -- 50, --, therefor.

On Title Page 2, in Item [56], under "OTHER PUBLICATIONS", in Column 2, Line 8, delete ""Bandwith-Efficient" and insert -- "Bandwidth-Efficient --, therefor.

On Title Page 2, in Item [56], under "OTHER PUBLICATIONS", in Column 2, Line 9, delete "16" and insert -- 16, --, therefor.

On Title Page 2, in Item [56], under "OTHER PUBLICATIONS", in Column 2, Line 21, delete "Shannong" and insert -- Shannon --, therefor.

On Title Page 2, in Item [56], under "OTHER PUBLICATIONS", in Column 2, Line 26, delete ""Multimensional" and insert -- "Multidimensional --, therefor.

Signed and Sealed this
Eighth Day of April, 2014

Michelle K. Lee
*Deputy Director of the United States Patent and Trademark Office*

CERTIFICATE OF CORRECTION (continued)
U.S. Pat. No. 8,418,018 B2

On Title Page 2, in Item [56], under "OTHER PUBLICATIONS", in Column 2, Line 43, delete "Group Group" and insert -- Group --, therefor.

On Title Page 2, in Item [56], under "OTHER PUBLICATIONS", in Column 2, Line 44, delete "25.212" and insert -- 25.212, --, therefor.

In the Drawings

Fig. 6, Drawing Sheet 6 of 6, delete " " and insert -- --, therefor.

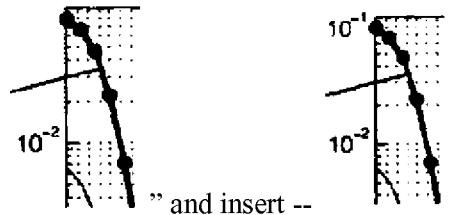

In the Specification

Column 2, Line 4, delete "ASDL" and insert -- ADSL --, therefor.

Column 2, Line 30, delete "$d_{free,hpc} > D_N^{n+p} d_{free,lpc}$" and insert -- $d_{free,hpc} > D_N^{n+p} d_{free,lpc}$ --, therefor.

Column 7, Line 66, delete "$\epsilon_{tcm}/\epsilon_{htcm}$." and insert -- $\epsilon_{tcm}/\epsilon_{htcm}$. --, therefor.

Column 10, Line 59, after Equation (11), insert -- . --.

Column 12, Line 10, after Equation (18), insert -- . --.

Column 12, Line 29, in Equation (20), delete "1.78 dB." and insert -- 1.76 dB. --, therefor.